United States Patent [19]

Kraus et al.

[11] Patent Number: 5,114,585

[45] Date of Patent: May 19, 1992

[54] CHARGED POROUS FILTER

[75] Inventors: Menahem Kraus, Ann Arbor; Diosie Velazquez, Saline; Chan-Hong Wang, Ann Arbor, all of Mich.

[73] Assignee: Gelman Sciences, Inc., Ann Arbor, Mich.

[21] Appl. No.: 462,283

[22] Filed: Dec. 27, 1989

Related U.S. Application Data

[63] Continuation of Ser. No. 166,727, Mar. 1, 1988, abandoned, which is a continuation of Ser. No. 894,337, Aug. 8, 1986, abandoned.

[51] Int. Cl.$^5$ .............................................. B01D 69/00
[52] U.S. Cl. .................................. 210/490; 210/500.42
[58] Field of Search ............ 427/245; 210/490, 500.23, 210/500.36, 500.27, 500.42

[56] References Cited

U.S. PATENT DOCUMENTS

| | | | |
|---|---|---|---|
| 2,783,894 | 3/1957 | Levell et al. | 210/203 |
| 3,408,315 | 10/1968 | Paine | 260/2.5 |
| 3,553,067 | 1/1971 | Dwyer et al. | 161/113 |
| 3,594,263 | 7/1971 | Dwyer et al. | 161/160 |
| 3,759,773 | 9/1973 | Dwyer et al. | 156/280 |
| 3,843,324 | 10/1974 | Edelman et al. | 23/230 |
| 3,875,044 | 4/1975 | Renn et al. | 204/299 |
| 3,876,738 | 4/1975 | Marinaccio et al. | 264/41 |
| 3,878,100 | 4/1975 | Bixler | 210/198 |
| 3,927,242 | 12/1975 | Rembaum et al. | 428/344 X |
| 3,963,662 | 6/1976 | Fujiwara et al. | 521/27 |
| 4,045,352 | 8/1977 | Rembaum et al. | 264/182 X |
| 4,048,038 | 9/1977 | Kunkle | 204/180 |
| 4,102,827 | 7/1978 | Rembaum et al. | 424/78 X |
| 4,106,920 | 8/1978 | Hughes et al. | 55/158 |
| 4,116,889 | 9/1978 | Chlanda et al. | 210/500.34 X |
| 4,128,470 | 12/1978 | Hiratsuka et al. | 204/299 |
| 4,243,507 | 1/1981 | Martin et al. | 204/301 |
| 4,297,198 | 10/1981 | Ohashi et al. | 204/299 |
| 4,352,884 | 10/1982 | Nakashima et al. | 435/180 |
| 4,415,428 | 11/1983 | Nochumson et al. | 204/299 |
| 4,455,370 | 6/1984 | Bartlesman et al. | 435/6 |
| 4,473,474 | 9/1984 | Ostreicher et al. | 210/636 |
| 4,473,475 | 9/1984 | Barnes, Jr. et al. | 210/639 |
| 4,512,896 | 4/1985 | Gershoni | 210/635 |
| 4,707,266 | 11/1987 | Degen et al. | 210/638 |

FOREIGN PATENT DOCUMENTS 0090483 6/1983 European Pat. Off. .
1213445 11/1970 United Kingdom .

OTHER PUBLICATIONS

"Zetabind TM", marketed by Cuno, a subsidiary of AMF Incorporated, 1983.

E. M. Southern, "Detection of Specific Sequences Among DNA Fragments Separated by Gel Electrophoresis", Journal of Molecular Biology, vol. 98, pp. 503-507, 1975.

M. Bittner, P. Kupferer, & C. F. Morris, "Electrophoretic Transfer of Proteins and Nucleic Acids from Slab Gels to Diazobenzyloxymethyl Gellulose or Nitrocellulose Sheets", Analytical Biochemistry, vol. 102, pp. 459-471, 1980.

"Durapore TM Membrane Disc Filter", by Millipore Corporation.

J. Reisner, J. Ronart & G. R. Stark, "Transfer of Small DNA Fragments from Polyacrylamide Gels to Diazobenzyloxymethyl-Paper & Detection of Hybridization with DNA Probes", Biochemical & Biophysical Research Communications, vol. 85, No. 3, pp. 1104-1112, 1978.

D. S. Singer, "Arrangement of a Highly Repeated DNA Sequence in the Genome and Chromatin of the African Green Monkey", Journal of Biological Chemistry, vol. 354, No. 12, pp. 5506-5514, 1979.

P. S. Thomas, "Hybridization of Denatured RNA and Small DNA Fragments Transferred to Nitrocellulose", Proceedings of National Academy of Science, U.S., vol. 77, No. 9, pp. 5201-5205, Sep. 1980.

J. M. Gershoni & G. E. Palade, "Electrophoretic Transfer of Proteins from Sodium Dodecyl Sulfate-Polyacrylamide Gels to Positively Charged Membrane Filter", Analytical Biochemistry, vol. 124, pp. 396-405, 1982.

Six letters which discuss nitrocellulose membranes written by Bart Bartelsman, dated Nov. 6, 1980; Dec. 18, 1980; Dec. 30, 1980; Jan. 15, 1981 (3).

P. Aptel & I. Cabasso, "Novel Polymer Alloy Membranes Composed of Poly(4-Vinyl Pyridine) and Cellulose Acetate. I. Asymmetric Membranes", Journal of Applied Polymer Science, vol. 25, pp. 1969-1989, 1980.

*Primary Examiner*—Frank Spear
*Attorney, Agent, or Firm*—Krass & Young

[57] ABSTRACT

A process for preparing charge modified filtration media including the steps of forming a filtration microporous or macroporous membranous or nonmembranous medium structure having internal and external surfaces and including a quaternizable nitrogen containing polymer exposed at the internal and external surfaces, permanently charging the exposed quaternizable nitrogen, and rendering the polymer insoluble in solution and permanently adhered within the filtration medium structure.

Charge modified filtration media including a filtration medium structure as described having internal and external surfaces, characterized by a quaternizable nitrogen containing polymer exposed at the internal and external surfaces and having permanently charged quaternizable nitrogen. The quaternized nitrogen containing polymer is insoluble in solution and permanently adhered within the filtration medium structure.

23 Claims, No Drawings

CHARGED POROUS FILTER

This application is a continuation of application Ser. No. 166,727, filed Mar. 1, 1988, now abandoned, which is a continuation of application Ser. No. 894,337, filed Aug. 8, 1986, now abandoned.

TECHNICAL FIELD

This invention relates to filtration membranes and the process for making the same. More particularly, this invention relates to charge modified filtration media used in the food and wine, cosmetics, pharmaceutical, and electronics industries.

BACKGROUND ART

The present invention relates to filtration media which may be membranous and nonmembranous. The membranous media may be macroporous or microporous. Microporous membranes are usually defined as thin walled structures having typically spongy morphologies with a narrow pore size distribution. The mean pore sizes for microporous membranes are between 0.01 μm and 10 μm. Microporous membranes have found widespread use in removing fine particulate matter such as dust and bacteria from liquids and gases.

The nonmembranous porous materials are materials such as woven and nonwoven fabrics, glass fiber mats, melt blown mats, felts, and the like. These porous nonmembranous materials are presently being used extensively as filtration media or as prefilters for membranous filtrations.

The function of most conventional filtration media is based on physical sieving wherein particles are captured by membrane pores smaller in diameter than the size of the particle or by impinging on small cells defined by fibers in the coarser filtration media. Although this principle is adequate for many applications, the need for removing finer and finer particles is increasing. This is especially true in the high-technology industries such as the electronics and pharmaceutical industries.

One method of removing smaller particles is simply to use membranes with correspondingly smaller pore sizes. This method is limited because the smaller pore size filtration media inherently possess a substantially reduced flow rate with concomitant increased expenditure in membrane area and operating costs.

An alternative which obviates the increased costs of filtration media having smaller and smaller pore sizes is the concept of combining the sieving filtration mechanism with an active absorption mechanism. High flow rates can be maintained using this combined concept while particle capture is much more efficient than indicated by the rated pore size of the filter.

One of the possible mechanisms for such absorption is electrokinetic capture. This is achieved by imparting an appropriate zeta potential to the filter's internal and external surfaces.

When a charged surface is immersed in an aqueous medium or other polar medium, a charge double layer will form at the solid-liquid interface. One component of the double layer is the charged solid surface. The other component or layer is a counter ionic region in the liquid. When the solid and liquid are set in relative motion, a potential difference will develop between the mobile and immobile regions in the liquid close to the surface. This potential, called the zeta potential is given for example for a fluid flowing through a charged porous medium by:

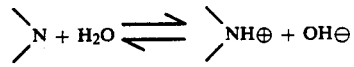

where ζ is the zeta potential, η is solution viscosity, D is dielectric constant, E is the streaming potential, P is the driving pressure and K is the specific conductance of the solution.

The zeta potential can be positive or negative depending on the charge of the surface. Most naturally occurring particle suspensions have negative zeta potentials. Therefore, such particles will be attracted to and absorbed by surfaces with positive zeta potentials. Applying a positive zeta potential to the available surface (both external and internal) of filter media will greatly improve capture capacity for small colloidal particles.

The U.S. Pat. No. 4,473,474 to Ostreicher et al issued Sep. 25, 1984, is an example of a charge modified microporous membrane and process for charge modifying the membrane. The European patent application 83300618.4 to Pall Corporation, published Oct. 5, 1983 discloses a modified skinless hydrophobic microporous polyamide membrane. Both the Ostreicher et al and Pall Corporation disclosures use the same principle of adding a preformed commercial quaternary ammonium polymer to a membrane. The U.S. Pat. No. 4,473,475 to Barnes Jr. et al, issued Sep. 25, 1984 also discloses a cationic charged modified microporous membrane and method of making the same. The Barnes, Jr. et al patent utilizes known epoxy chemistry to post-treat a membrane.

Each of these membranes and methods of making the same suffer from a number of drawbacks including slow flush-out times to obtain a high resistivity permeate, low charge capacity, and pH sensitivity of capture ability.

Some of the aforementioned patents disclose methods and membranes which are pH dependent in order to maintain a charged surface. The aforementioned membranes depend on the basicity of an amine to acquire a charge in aqueous media. This is exemplified by the formula:

$$\diagdown\!\!\!\!N\diagup + H_2O \rightleftharpoons \diagdown\!\!\!\!N\diagup H\oplus + OH\ominus$$

These systems may lose their charge at high pH because of the equilibrium illustrated above. Hence, these systems do not maintain a permanent charged surface.

Poly(vinylpyridine) and high molecular weight polyalkylene-imine polymers have not been used before in making or modifying microporous membranes. Very little work has been done on the use of these polymers in membranes in general. Some work has been done on using a true polymer blend of poly(vinylpyridine) and cellulose acetate to make reverse osmosis membranes. These membranes are designed to separate salt from an aqueous solution and are entirely different from those discussed regarding the present invention. The main effect seen was an improvement in membrane water throughput compared to a membrane without poly(-vinylpyridine). (Aptel et al, J-Appl. Pol. Sci., 25, 1969 (1980)).

STATEMENT OF THE INVENTION

The present invention provides a process for preparing charge modified filtration media including the steps of forming a filtration medium structure having internal and external surfaces and including a quaternizable nitrogen containing high molecular weight polymer exposed at the internal and external surfaces. The exposed quaternizable nitrogen is permanently charged and the polymer is rendered insoluble and permanently adhered within the filtration medium structure by the action of a polyfunctional alkylating agent.

The present invention further provides a charge, modified filtration medium including a preformed microporous or macroporous filtration structure characterized by being inherently permeable to albumin solutes and including an internal surface and an external surface. The charge modified filtration medium is characterized by a quaternized nitrogen containing high weight molecular polymer being exposed at the internal and external surfaces and having permanently charged quaternized nitrogen. The quaternized nitrogen containing polymer is insoluble and permanently adhered within the filtration medium.

DETAILED DESCRIPTION OF THE INVENTION

In accordance with the instant invention, a process for preparing charge modified filtration media generally includes the steps of forming a filtration medium structure having internal and external surfaces and including a quaternizable nitrogen containing polymer exposed at the internal and external surfaces, permanently charging the exposed quaternizable nitrogen, and rendering the polymer insoluble and permanently adhered within the filtration medium structure by the action of a polyfunctional alkylating agent.

In one preferred embodiment poly(vinylpyridine) based polymers are utilized as quaternizable nitrogen containing high molecular weight polymers. Examples of poly(vinylpyridine) based polymers suitable for the use in the instant invention are poly(4-vinylpyridine), poly(2-vinylpyridine), copoly(vinylpyridinestyrene), and copoly(vinylpyridine-acrylonitrile).

Other quaternizable nitrogen containing polymers have been found to be useful in the instant invention. For example, the high molecular weight polyalkylene imines are suitable for use with the instant invention. Polyethylene-imine in particular is well suited for use in the instant invention as it may be permanently positively charged and is susceptible to alkylation.

More specifically, the exposed quaternizable nitrogen containing polymer is treated with a polyfunctional alkylating agent to alkylate the exposed quaternizable nitrogens. Simultaneously, the exposed quaternizable nitrogen containing polymer is rendered insoluble and permanently charged by cross-linking the polymer at the exposed quaternizable nitrogens. Preferably, this is accomplished by treating the exposed quaternizable nitrogen containing polymer with a difunctional alkylating agent.

Preferably, the difunctional alkylating agent is a dihaloalkane. Examples of difunctional alkylating agents are 1,4-dibromobutane; 1,4-dibromobutene; 1,4-dichlorobutene; $\alpha,\alpha$-dibromoxylene; 1,4 diodobutane; the diol ditosylates; 1,3 dichloro-2-propanol; 1,3 dibromo-2-propanol or 1,2-dibromo-3-propanol.

The invention essentially consists of applying a positive zeta potential by alkylation of the quaternizable nitrogen in the quaternizable nitrogen containing polymer using totally different chemistry than that of the prior art. This helps solve the above discussed shortcomings of presently available membranes. The invention provides a porous membranous or nonmembranous filter material containing a quaternizable nitrogen containing polymer which has been cross-linked and charged by post treatment with alkylating agents.

Exemplifying the mechanisms of the instant invention, poly(vinylpyridine) can be converted into a permanently charged form by alkylating at the ring nitrogen as schematically indicated below.

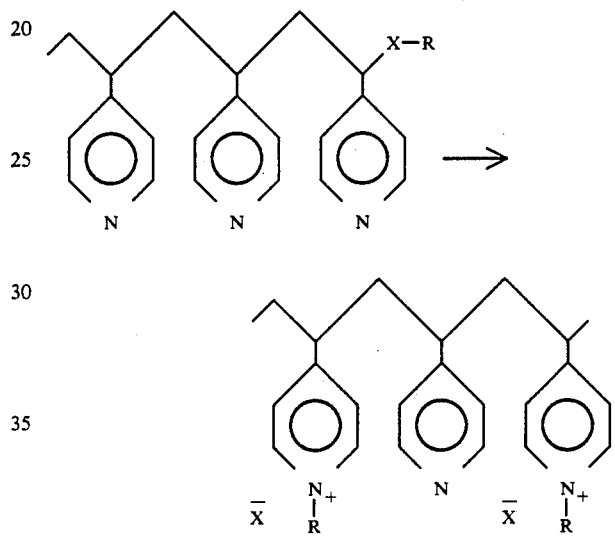

The poly(vinylpyridine) contained in a porous material is simultaneously charged and rendered insoluble by the cross linking reaction with a difunctional alkylating agent as schematically shown below.

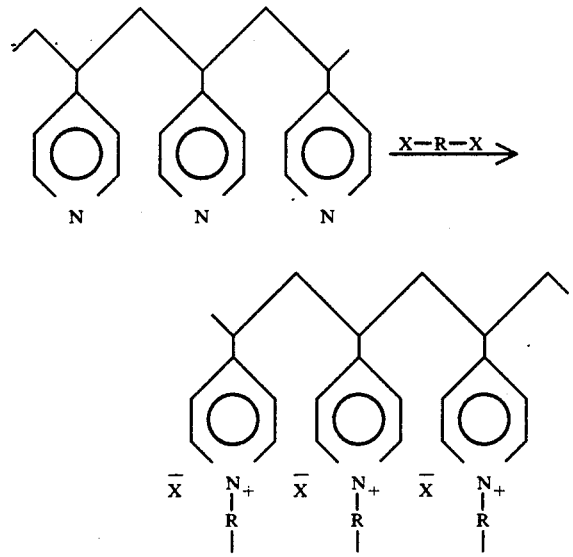

-continued

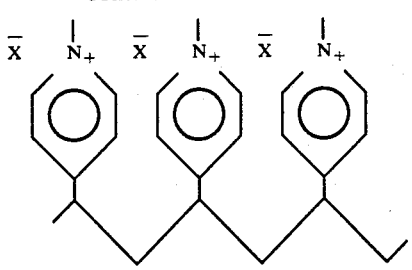

Many possible variations to this process can be applied to a variety of membranes and other porous materials.

The filtration medium structure may also be formed by incorporating the quaternizable nitrogen containing polymer within the filtration medium structure per se. The quaternizable nitrogen containing polymer is blended with a matrix forming polymer in a solvent containing casting solution. The solution is cast on a support surface, phase separation is induced and the solvent is then leached out from the solution.

Casting may be done on a support surface such as a flat glass surface or a flat stainless steel surface.

Phase separation may be induced by exposing the cast solution to humid air or by other means common in the art.

The formed membrane is treated with the difunctional alkylating agent to permanently charge the exposed quaternizable nitrogen.

Poly(vinylpyridine) polymers do not form true blends with most membrane polymers, such as nylons or polysulfone as determined, for example, by differential scanning calorimetry. It is therefore surprising that the membranes made from these mixtures have very good mechanical properties and retain the polyvinylpyridine very tenaciously. The charging levels of these membranes are equivalent to those made according to the alternative methods discussed below. Additionally, many poly(vinylpyridine) polymers are hydrophilic. These polymers become even more hydrophilic upon charging pursuant to the present invention. This treatment has the additional benefit that, when applied to many hydrophobic surfaces, it will render them hydrophilic and inherently wettable.

In a preferred embodiment, a 4% to 10% solution of poly(vinylpyridine) is dissolved with a membrane forming solution of a matrix polymer, such as polyethersulfone in a membrane casting solution. The membrane is cast on a flat glass or stainless steel surface and phase separation is induced by exposure to humid air. After the process of leaching out the solvent and drying, the membrane is treated with the cross-linking agent. The resulting membrane has been found to be mechanically strong and has good charge capacity, flows and bubble points, as shown by the examples discussed below.

Alternatively, the quaternizable nitrogen containing compound may be adhered to the internal and external surfaces of a preformed filtration structure while not being incorporated into the filtration structure during its forming steps. The quaternizable nitrogen containing compound may be adhered by exposing a preformed filtration medium structure to a solvent containing solution of the quaternizable nitrogen containing polymer. The treated medium structure is then dried.

The preformed filtration medium structure may be a preformed porous membrane or other, nonmembranous porous structure. Examples of membranes are macroporous membranes and microporous membranes made from polymers such as nylon, polyacrylonitrile, polyamide-imide and polyethersulfone. Nonmembranous porous materials may be used, such as wovens, nonwovens, and felts. Obviously the above range of materials would include filters which are permeable to albumin.

Preferably, the filtration medium structure is exposed to the solution containing the quaternizable nitrogen containing polymer and then dried. Afterwards, the filtration medium structure is exposed to a solution of a difunctional alkylating agent wherein the difunctional alkylating agent is dissolved in a solvent which spares the medium structure and the adhered quaternizable nitrogen containing polymer. The post-treated medium is then dried. Examples of such solvents are hydrocarbon solvents such as hexane and octane.

In certain cases the polyfunctional alkylating agent may be premixed with the nitrogen containing polymer and the whole post treatment carried out in a simple step.

In a preferred method, the medium structure is soaked in a dilute solution of the quaternizable nitrogen containing polymer for 5 to 10 minutes at ambient temperature. The dilute solution of quaternizable nitrogen containing polymer can contain from 0.5% to 2% of the polymer. The medium structure is then exposed to a solution of the difunctional alkylating agent for 5 to 10 minutes at from ambient temperature to 100° C., depending on the reactivity of the difunctional alkylating agent. For example, an allylic bromine is sufficiently reactive that the treatment can be carried out at ambient temperature with a relatively short reaction time. Thus after air drying, the medium structure may be immersed in a dilute solution of about 1% of the dibromobutene for 5 to 15 minutes. For less reactive alkylhalides, such as dibromobutane, temperatures of over 100° C. must be used. The product, however, is more stable than that obtained with the dibromobutene.

The filtration medium structure may be exposed to the treatment solutions of the quaternizable nitrogen containing polymer and the difunctional alkylating agent by several methods. Examples of methods are simple immersion, unrolling of a membrane roll and passing through the treating solutions, and treating complete devices, such as filter cartridges made from plastic which support filter membranes.

An inherent advantage of the method of this invention over the previously used charging schemes is the permanence of the charge. The positive charge of the quaternized pyridine nucleus and the quaternized nitrogen in the polyalkylene-imine is independent of environmental effects, such as pH. This is not the case with systems that depend on the basicity of an amine to acquire a charge in aqueous treating medium.

The instant invention further provides charge modified filtration medium including a filtration medium structure having an internal surface and an external surface and characterized by a quaternizable nitrogen containing polymer exposed at the internal and external surfaces and having permanently charged quaternizable nitrogen. The quaternized nitrogen containing polymer is insoluble and permanently adhered within the filtration medium structure. The quaternized nitrogen containing polymer is permanently charged by the reaction with the alkylating agent. The quaternized nitrogen containing polymer is rendered permanently insoluble and charged by cross-linking the quaternizable nitrogen containing polymer with a difunctional alkylating agent.

TESTING METHODS

The following are explanations of tests preformed in the Examples.

Bubble point. This common test for microporous filters is a measure of the largest pores in a membrane. It consists of expelling liquid from a wetted membrane by air pressure. Pore size and the pressure necessary to remove liquid from that pore are related by:

$$P = \frac{B\gamma\cos\theta}{D}$$

where P is the pressure, $\theta$ is the contact angle between the membrane material and the liquid, $\alpha$ is surface tension, D is pore diameter and B is a constant.

Water permeability is the flow of water through the medium normalized to unit area and time at 10 psi driving pressure.

DI water flushout is the volume of 18 deionized water necessary to flush the membrane so as to obtain a permeate of 18 megohms resistivity.

Dye adsorption. Surfaces that have a positive zeta potential will adsorb negatively charged dyes. This can be used to quantify the charging efficiency. The absorbance of the membrane permeate is monitored as a function of volume.

Dye breakthrough is defined as the volume at which permeate absorbance exceeds 0.1 units.

Ion exchange capacity is determined as meq per gram of membrane by ion chromatography.

Endotoxin removal efficiency is determined by challenging the membrane by a known concentration and volume of purified endotoxin and measuring endotoxin in the permeate.

EXAMPLE 1

Polyethersulfone Microporous Membrane

Polyethersulfone resin (Victrex 5200, ICI), 13 parts is dissolved in a mixture of 18 parts dimethylformamide and 69 parts polyethyleneglycol.

After stirring to homogeneity, the solution is cast onto a glass plate or endless stainless steel belt. The cast solution is subjected to ambient air at 60-70% relative humidity until phase separation occurs and the membrane becomes opaque. It is then submerged in water to remove excess solvent and dried.

This membrane had a water bubble point of 53 psi, a water flux of 23 ml/cm$^2$/min at 10 psi. When challenged by 10$^7$/cm$^2$ *Pseudomonas diminuta*, it showed 100% retention.

EXAMPLE 2

Polyethersulfone 0.2 u Membrane treated with Poly(4-vinylpyridine) and 1,4-Dibromobutene A 47 mm membrane disc was immersed in a 0.1 wt/vol percent solution of poly(4-vinylpyridine) in isopropanol for 5 minutes. It was dried in ambient air and then soaked in a 1% solution of 1,4-dibromobutene in hexane for 15 minutes. It was then dried at 100.C for 15 minutes.

Elemental analysis showed the incorporation of nitrogen and bromine. An anion exchange capacity of 0.66 meq/gr was measured for the modified membrane.

Endotoxin removal efficiency was tested as follows. A modified polyethersulfone membrane, an unmodified membrane, and a commercial charged membrane, all in the form of 47 mm discs, were each challenged with 500 ml of 2.5 ng/ml of purified *E. coli* endotoxin. All filtrates were tested for endotoxin by the LAL method. Results are summarized in the following table.

|  | Endotoxin Challenge (ng/ml) | Endotoxin in Filtrate (ng/ml) |
| --- | --- | --- |
| Treated Membrane | 2.5 | 0.025 |
| Untreated Membrane | 2.5 | 0.25 |
| Commercial Positive Membrane | 2.5 | 0.025 |

EXAMPLE 3.

Polyethersulfone Membrane Treated with Polyvinylpyridine and Di-bromobutene

A post-treatment was carried out under conditions similar to those of Example 1, except the concentration of poly(vinylpyridine) was increased to 1%. The flow rate of the treated membrane was 16 ml/cm$^2$/min at 10 psi and the water bubble point was 63 psi. This performance is superior to that of commercial charged membranes.

Dye breakthrough testing was done with dilute solution (8 ppm) of a negatively charged dye, Metanil Yellow (Ciba Geigy). The solution was passed throught the test disc slowly and the absorbance of the filtrate monitored.

Breakthrough is defined as the filtrate volume at which absorbance begins to increase above that of deionized water. The breakthrough volume was 300 ml. In a control experiment, a commercial positive membrane showed similar breakthough.

A membrane similarly made was autoclaved at 250° F. for 30 minutes. No change in bubble point, water flow rate or dye absorption were observed. The performance (charge capacity) of the membrane at high pH was superior to that of commercial charged membranes.

EXAMPLE 4

Nylon 0.2 $\mu$ Membrane Treated by Polyvinylpyridine and Dibromobutene

A Gelman 0.2 $\mu$ nylon membrane was treated with .1% poly(vinylpyridine) in isopropanol, dried in air 20 minutes, treated with 2% dibromobutene during 1 hour, dried at 80° C. and washed in isopropanol. Dye breakthrough was equivalent to the membrane in Example 2. Flow rate was slower.

EXAMPLE 5

Polyamide-imide Microporous Membrane

A polyamide-imide microporous (0.2 u) membrane is made as follows. Polyamide-imide resin (Torlon 4000TF, Amoco), 11.5 parts is dissolved in 40 parts of N,N-dimethylformamide and 48.5 parts polyethyleneglycol. The mixture is stirred to homogeneity and cast on a glass plate or an endless stainless steel belt. The cast solution is exposed to 60-70% relative humidity ambient air until phase separation occurs and the membrane becomes opaque. It is then immersed in water to remove excess solvents and dried at 70° C. The membrane is inherently water wettable and has a water bubble point of 54 psi and water flux rate of 19 ml/cm²/min at 10 psi.

EXAMPLE 6

Polyamide-imide Membrane Treated with Poly(vinylpyridine) and Dibromobutene

A polyamide-imide membrane, 0.2 u, made as in Example 5, was treated for 15 minutes with 1% poly(vinylpyridine) in isopropanol, dried, and exposed to dibromobutene for 15 minutes, dried and washed in isopropanol.

Dye breakthrough was 120 ml and flow rate was slower than the membrane of Example 2.

EXAMPLE 7

Polyethersulfone Membrane Treated With Poly(vinylpyridine) and Bis(2-chloroethoxyl)ethane A microporous polyethersulfone membrane was treated as in Example 2 except bis(2-chloroethoxyethane) was substituted for dibromobutene. The charging was less effective even at 120° C. and dye breakthrough was about 50 ml.

EXAMPLES 8-13

Polyethersulfone Membrane Treated with Poly(vinylpyridine) and 1,4-Dibromobutane The membrane treated as in Example 2 and 3 is somewhat difficult to flush to high resistivity filtrate and had extractable levels higher than desired for certain applications.

A good alternative is 1,4-dibromobutane. The reagent is less reactive than 1,4-dibromobutene, but the reaction product is more stable.

The membrane disc was immersed in 1% polyvinylpyridine in isopropanol for 10 minutes and air dried. It was then treated with a 4% dibromobutane solution in octane at 120° C. for 20 minutes. Dye breakthrough was 300 ml. The following table summarizes the effect of reaction temperature and reagent concentration on charging.

| Example No. | Dibromobutane Concentration (% wt/vol) | Reaction Temp (°C.) | Drying Temp (°C.) | Dye Breakthrough (ml) |
|---|---|---|---|---|
| 8. | 0.5 | Ambient | 80° | 50 |
| 9. | 2 | Ambient | 100° | 100 |
| 10. | 4 | Ambient | 100° | 150 |
| 11. | 4 (twice) | Ambient | 100° | 200 |
| 12. | 4 | 80° | 100° | 200 |
| 13. | 4 | 125° | 120 | 250-350 |

Poly(vinylpyridine) concentration was 1% in all experiments. Reaction time was 20 minutes in all experiments.

DI water flushout required 10 liters for 17.5 megohm filtrate. A dibromobutene treated membrane required 36 liters whereas a commercial charged membrane required 20 liters. Membrane properties such as bubble point, water flux or dye breakthrough did not change upon autoclaving for 30 minutes at 250° F.

EXAMPLE 14

Polyethersulfone-Polyvinylpyridine Blends

An alternative to post-treating a membrane in a two-stage process is to blend the treating polymer with the matrix polymer and then post-treating in a single stage to apply the charge. A typical membrane casting mix had the following composition.

| | |
|---|---|
| Polyethersulfone | 12.8% |
| N,N-Dimethylformamide | 9.5% |
| NMP | 7.5% |
| Polyethylenegylcol | 64.5% |
| Poly(vinylpyridine) | 0.6% |
| Methanol | 2.6% |
| Glycerine | 0.5% |
| Water | 1.9% |

The solution was cast on glass or an endless stainless steel belt, exposed to humid air for phase separation and coagulated in water. The dried membrane was treated with 4% dibromobutane in octane. The membrane obtained was strong, easy to handle, and inherently wettable. Following an isopropanol wash, extractable levels were low: 0-0.2%. Dye breakthrough was 250 ml.

EXAMPLE 15

Charged Glass Fiber (A)

Discs of Gelman Metrigard ® polypropylene membrane and AR glass were each soaked 10 minutes in a 1% solution of polyvinylpyridine and then air dried. They were each then subjected to a 2% solution of dibromobutane in hexane at ambient temperature for 48 hrs.

Dye breakthrough for AR glass was 150 ml. For Metrigard, it was 200 ml, equivalent to that of microporous membranes.

EXAMPLE 16

Charged Glass Fiber (B)

Glass fiber discs were immersed in a dilute aqueous solution of polyethylene-imine and dried. They were subjected to an isopropanol solution of 1,3-dibromo-2-propanol at ambient temperature and dried at 70° C. Charge capacity was much higher than with the treatment of Example 15, and dye breakthrough was 2000-3000 ml.

EXAMPLE 17

Charged Polypropylene Prefilter

The following experiment demonstrated the chargeability of fibrous matrices. A Hytrex ® polypropylene filter was partially immersed in a 1% solution of poly(vinylpyridine) in isopropanol. After drying, the same partially immersed section was soaked in a 1% solution of dibromobutene in hexane for 1 hour. Excess reagents were washed out and the cartridge dried. The cartridge was then immersed in a dilute solution of Metanil Yellow to a level higher than the charging level. On removal and washing it was observed that dye absorption was much stronger in the charged section than in the untreated area.

EXAMPLE 18

Polyether Sulfone Membrane Treated with Polyethleneimine and Dibromopropanol A polyether sulfone membrane prepared as in Example 1 was immersed in an isopropanol solution containing 2% polyethyleneimine and 10% 2, 3-dibromo- 1-propanol and dried at 105° C. Dye breakthrough was 50% higher than that of a commercial charged membrane and permeability was 100% higher.

What is claimed is:

1. A charged filtration medium comprising:
   a pre-formed, microporous or macroporous filtration medium structure characterized by being inherently permeable to albumin solutes and having internal and external surfaces; and
   a preformed non-particulate polymer selected from polyvinylpyridine and polyalkyleneimine, said polymer by a post-treatment being physically adhered to said surfaces in surface covering relation, the nitrogen of said polymer by a post-treatment being quaternized and the thus adhered polymer being rendered charged and insoluble and adhered to said surfaces by alkylating exposure of the polymer to a solution of a polyfunctional alkylating agent in a compatible solvent.

2. The filtration medium of claim 1 wherein said polymer is a poly(vinylpyridine).

3. The filtration medium of claim 2 wherein said poly(vinylpyridine) polymer is selected from the group consisting of poly(4-vinylpyridine), poly(2-vinylpyridine), copoly(vinylpyridinestyrene), and copoly(vinylpyridineacrylonitrile).

4. The filtration medium of claim 1 wherein said polymer is a polyalkyleneimine.

5. The filtration medium of claim 1 wherein said polymer comprises about 4 to about 10% by weight of said filtration medium.

6. The filtration medium of claim 1 wherein said alkylating agent is a dihaloalkane.

7. The filtration medium of claim 1 wherein said alkylating agent is selected from the group consisting of 1,4-dibromobutane; 1,4-dibromobutene; 1,4-dichlorobutene; α,α dibromoxylene; 1,4-diiodobutane; diol ditosylate; 1,3-dichloro-2-propanol; 1,3-dibromo-2-propanol; and 1,2-dibromo-3-propanol.

8. The filtration medium of claim 1 wherein said polymer is rendered permanently charged and insoluble by cross-linking alkylation at the exposed quaternizable nitrogens.

9. The filtration medium of claim 1 wherein said filtration medium structure comprises a membranous material.

10. The filtration medium of claim 1 wherein said filtration medium structure comprises a nonmembranous material.

11. A charge modified filtration medium comprising:
    a preformed, microporous filtration medium structure characterized by being inherently permeable to albumin solutes and having internal and external surfaces; and
    a preformed polymer containing quaternizable nitrogen which polymer in a post-treatment is physically adhered to said structure by exposing said structure to a first surface coating of a solution of said polymer in a compatible solvent for the polymer, drying the thus coated structure, exposing the dry, first coated structure to a second surface coating of a solution of a polyfunctional alkylating agent in a compatible solvent sufficient to quaternize the quaternizable nitrogen and thereby render it charged and insoluble, and drying the latter coated structure.

12. The filtration medium of claim 11 wherein said filtration medium structure is a membrane.

13. A process for charge modifying a filtration medium comprising:
    providing a preformed, microporous filtration medium structure characterized by being inherently permeable to albumin solutes and having an internal surface and an external surface;
    physically coating the surfaces of said filtration medium structure with a first coat of a solution of a polymer selected from polyvinylpyridine and polyethyleneimine in a compatible solvent;
    drying the thus coated structure;
    coating said first coated structure with a second coat of a solution of a difunctional alkylating agent in a compatible solvent such that the nitrogen of said polymer coating is quaternized and said polymer is thereby permanently charged, cross-linked and insoluble; and
    drying the latter coated structure.

14. The process of claim 13 wherein said filtration medium structure is a membrane.

15. The process of claim 13 further comprising allowing said polymer to dry on said filtration medium structure prior to treating the polymer with said alkylating agent.

16. The process of claim 13 wherein the polymer is treated with the alkylating agent at the same time the filtration medium structure is exposed to the polymer.

17. The process of claim 13 wherein said filtration medium structure is exposed to said polymer by soaking said structure in a solution containing about 0.5% to about 2.0% polymer.

18. The process of claim 17 wherein said structure is soaked in said solution for about 5 to about 10 minutes at ambient temperature.

19. The process of claim 13 wherein said alkylating agent is a dihaloalkane.

20. The process of claim 13 wherein said alkylating agent is selected from the group consisting of 1,4-dibromobutane; 1,4-dibromobutene; 1,4-dichlorobutene; α,α-dibromoxylene; 1,4-diiodobutane; diol ditosylates; 2-propanol; 1,3-dibromo-2-propanol; and 1,2-dibromo-3-propanol.

21. The process of claim 13 wherein said polymer containing quaternizable nitrogen is a poly(vinylpyridine).

22. The process of claim 13 wherein said poly(vinylpyridine) polymer is selected from the group consisting of poly(4-vinylpyridine), poly(2-vinylpyridine), copoly(vinylpyridinestyrene), and copoly(vinylpyridineacrylonitrile).

23. The process of claim 13 wherein said polymer containing quaternizable nitrogen is a polyalkyleneimine polymer.

* * * * *

UNITED STATES PATENT AND TRADEMARK OFFICE
CERTIFICATE OF CORRECTION

PATENT NO. : 5,114,585

DATED : May 19, 1992

INVENTOR(S) : Kraus et al.

It is certified that error appears in the above-identified patent and that said Letters Patent is hereby corrected as shown below:

Column 7, line 22, delete "18 deionized" and insert --18 megohms deionized--;

Column 7, line 58, delete "47 mm" and insert --47-mm;

Column 7, line 62, delete "100.C" and insert --100°C--;

Column 8, line 2, delete "47 mm" and insert --47-mm--;

Column 8, line 22, delete "Example 1" and insert --Example 2--.

Signed and Sealed this

Seventh Day of September, 1993

Attest:

BRUCE LEHMAN

Attesting Officer

Commissioner of Patents and Trademarks